US012616178B2

(12) United States Patent
Peterson et al.

(10) Patent No.: US 12,616,178 B2
(45) Date of Patent: May 5, 2026

(54) LURE

(71) Applicant: Pure Fishing, Inc., Spirit Lake, IA (US)

(72) Inventors: Kyle Jacob Peterson, Spirit Lake, IA (US); Daniel Eric Spengler, Milford, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 18/604,408

(22) Filed: Mar. 13, 2024

(65) Prior Publication Data

US 2024/0306620 A1     Sep. 19, 2024

Related U.S. Application Data

(60) Provisional application No. 63/490,433, filed on Mar. 15, 2023.

(51) Int. Cl.
*A01K 85/00*          (2006.01)

(52) U.S. Cl.
CPC ...... *A01K 85/1833* (2022.02); *A01K 85/1811* (2022.02); *A01K 85/1837* (2022.02)

(58) Field of Classification Search
CPC .................................................. A01K 85/1737
See application file for complete search history.

(56) References Cited

U.S. PATENT DOCUMENTS

| | | | | | |
|---|---|---|---|---|---|
| 4,887,377 | A | * | 12/1989 | Morris | A01K 85/00 43/42.24 |
| 5,070,639 | A | * | 12/1991 | Pippert | A01K 85/01 43/42.31 |
| 5,289,831 | A | | 3/1994 | Bosley | |
| 5,806,234 | A | * | 9/1998 | Nichols | A01K 85/00 43/42.39 |
| 6,718,683 | B2 | * | 4/2004 | Hawkins | A01K 85/00 43/42.38 |
| 7,627,979 | B2 | * | 12/2009 | Huddleston | A01K 85/00 43/42.22 |
| 7,827,731 | B2 | * | 11/2010 | Gibson | A01K 85/00 43/42.39 |
| 8,966,810 | B2 | * | 3/2015 | Scott | A01K 85/00 43/42.22 |

(Continued)

FOREIGN PATENT DOCUMENTS

| | | | | |
|---|---|---|---|---|
| DE | 202019002953 | U1 * | 8/2019 | A01K 85/00 |
| WO | 2005110077 | A2 | 11/2005 | |

*Primary Examiner* — Christopher P Ellis
(74) *Attorney, Agent, or Firm* — Husch Blackwell LLP

(57) ABSTRACT

The present disclosure relates to an artificial bait having certain physical characteristics that allow for it to remain forward-facing in the water to be quickly detected location- and direction-wise using sonar techniques. The characteristics of the bait also allow for it to engage in erratic darting action and remain in the water during retrieval for an extended period of time. Typically, the bait can include a body having a head portion, a tail portion, and a middle portion therebetween. A first attachment structure configured to receive a line can be located on or near the head portion. A hook structure can be inserted behind the first attachment structure, for example, on or near the middle portion of the body. The head portion can further include a portion of dense material therein.

6 Claims, 3 Drawing Sheets

(56)  References Cited

U.S. PATENT DOCUMENTS

| 12,356,970 B1 * | 7/2025 | Duvall | A01K 85/16 |
| 2023/0095841 A1 * | 3/2023 | Langley | A01K 85/018 |
| | | | 43/42.06 |
| 2024/0099282 A1 * | 3/2024 | Olsen | A01K 85/16 |
| 2025/0017185 A1 * | 1/2025 | Rosher | A01K 85/1833 |

\* cited by examiner

LURE

CROSS-REFERENCE TO RELATED APPLICATIONS

This application claims priority to U.S. Provisional Patent Application Ser. No. 63/490,433, filed on Mar. 15, 2023, entitled "LURE," the entire disclosure of which is hereby incorporated herein by reference.

FIELD OF THE INVENTION

The present disclosure relates to an artificial bait having a dense and sonar-readable material in its head portion.

BACKGROUND OF THE INVENTION

Fishing baits are used to help anglers catch fish. They are typically attached to an end of a fishing line and are designed to attract a fish to bite on a hook attached to the fishing bait. Anglers use one of a natural bait or an artificial bait to attract fish.

Natural, or live, baits are effective because they have a familiar texture, odor, and color to fish. Further, especially when live, natural baits can mimic movements that are natural to fish prey. Anglers use many sources for natural baits, including but not limited to: earthworms, minnows, grubs, maggots, grasshoppers, crickets, bees, aquatic snails, small frogs, tadpoles, crayfish, and even ants.

Unfortunately, natural baits have some downsides. First, they can be a hassle to obtain. They require either foraging for live bait or finding a store that sells live bait. In both cases, the natural bait must be acquired shortly before fishing. This can be inconvenient or even challenging at times. Furthermore, natural baits are inherently "single use" products. Natural bait can be consumed by fish (whether caught or not), or it can fall off a hook during the repetitive cast and reel fishing process, at which time it needs to be replaced. As a result of some of the inconveniences associated with natural baits, many anglers have turned to artificial baits.

Artificial fishing baits are designed to simulate or resemble a natural food source (e.g., a bait fish) for fish both in appearance and in movement as the baits move through the water. The artificial baits are often made of a plastic or a rubber material and thus can be used multiple times over. While artificial baits are made to imitate prey or prey characteristics such as color, flash, or shape, it is quite difficult to reproduce the natural movements of natural bait. Artificial baits include undulations, recesses, and projections that may interact with water to simulate natural movement. However, such movement is dependent on the bait's surrounding, and it cannot independently move. Some baits have incorporated electronics to simulate movement, but those baits are subject to breaking easily and often generate noise that is unnatural and makes fish skeptical.

Furthermore, artificial fishing baits are conventionally difficult to detect on sonar and distinguish from other objects, making it hard for anglers to locate their lures in water. The present disclosure seeks to address these disadvantages.

SUMMARY OF THE INVENTION

The present invention overcomes many of the shortcomings and limitations of the prior art devices discussed above. The present invention relates generally to an artificial bait (lure) that may provide erratic darting action, an adjustable sink rate, and retrieval vibrations due to certain aspects discussed herein. In particular, the bait shape including its arching back, the location of a pull point, and/or the relative density of portions of the bait contribute to these advantageous aspects of the bait.

These aspects of the bait allow anglers to better control where the bait is placed in water and the particular actions which are presented by the bait. For example, anglers are better able to fish on the bottom or mid-water column while working the bait in a single location. The bait allows for switching of presentations, actions, and techniques on a single cast.

Furthermore, the bait described herein can be particularly advantageous when used with sonar. The aforementioned aspects allow the bait to remain forward-facing in the water, where it can easily be picked up by sonar techniques due to the lead present in the head portion of the bait.

Thus, the bait comprises a body having a head portion, a tail portion, and a middle portion between said head and tail portions. The head portion includes a first attachment structure for a line or lead thereon. Typically, a hook is present behind the first attachment structure on the head portion or the middle portion and angled respective to both the first attachment structure and a longitudinal axis of the bait. The head portion can include a portion of dense material therein.

These and other aspects and advantages of the present invention will become apparent to those skilled in the art after considering the following detailed description in connection with the accompanying drawings.

Figure 1:
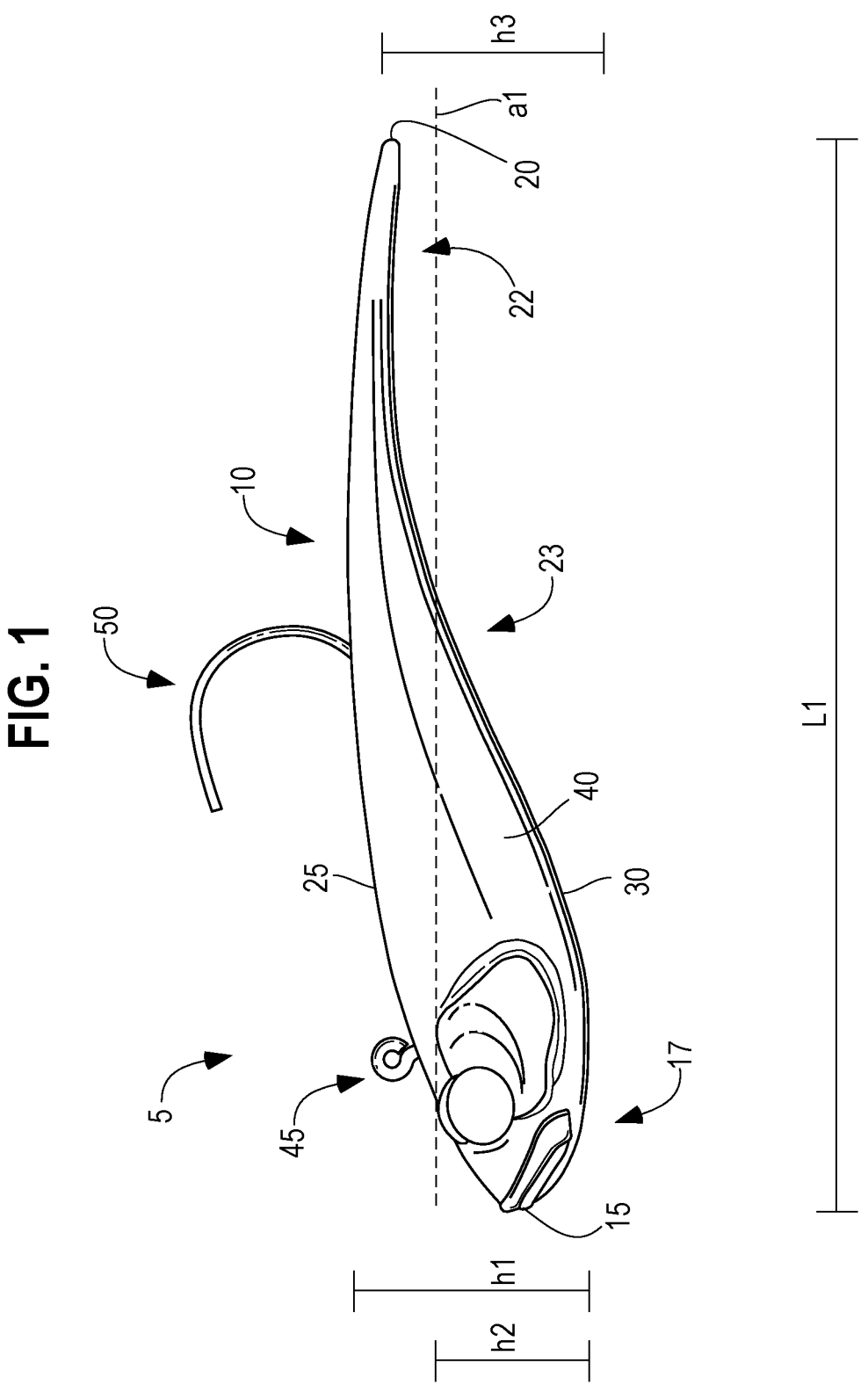
FIG. 1 is a side plan view of a lure according to the present disclosure.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Turning now to FIG. 1, the present disclosure relates to a bait (lure) generally indicated by reference numeral 5. The bait 5 can include a body 10 that resembles a natural shape of a bait fish typically used for fishing in fresh or salt waters. In particular, the bait 5 may be a jig that is designed to be jerked up and down, side-to-side, or otherwise drawn through the water. The body 5 may be composed of a plastic material, a rubber material, or a combination thereof. As a result, the body 10 is preferably flexible such that the bait 5 moves through the water similar to the natural movement of a bait fish.

The body 10 may include a front or head end 15 corresponding to a front or head portion 17 and a rear or tail end 20 corresponding to a rear or tail portion 22 with a middle portion 23 therebetween. The ends 15, 20 may define a length L1 along a longitudinal axis al of the body 10 of the bait 5. The body 10 may also include a top 25 and a bottom 30. The top 25 and the bottom 30 may define a height or a transverse dimension h1 of the body 10. The height/transverse dimension h1 of the body 10 may vary along the length/longitudinal dimension L1. The body 10 may also include a right side (not shown due to perspective) and a left side 40 that together define a width or lateral dimension of the body 10 of the bait 5. The width/lateral dimension may vary over the length/longitudinal dimension L1 and/or the height/transverse dimension h1 of the body 10.

Typically, the body 10 of the bait 5 is arched. In this way, the height of the front portion h2 and the height of the rear portion h3 can be lower than the height of the middle portion (or the maximum height of the bait 5) h1. In various embodiments, the height of the front portion h2 can be lower than the height of both the middle and rear portions h1, h3, and the height of the rear portion h3 can be lower than the height of the middle portion h1.

Figure 2:
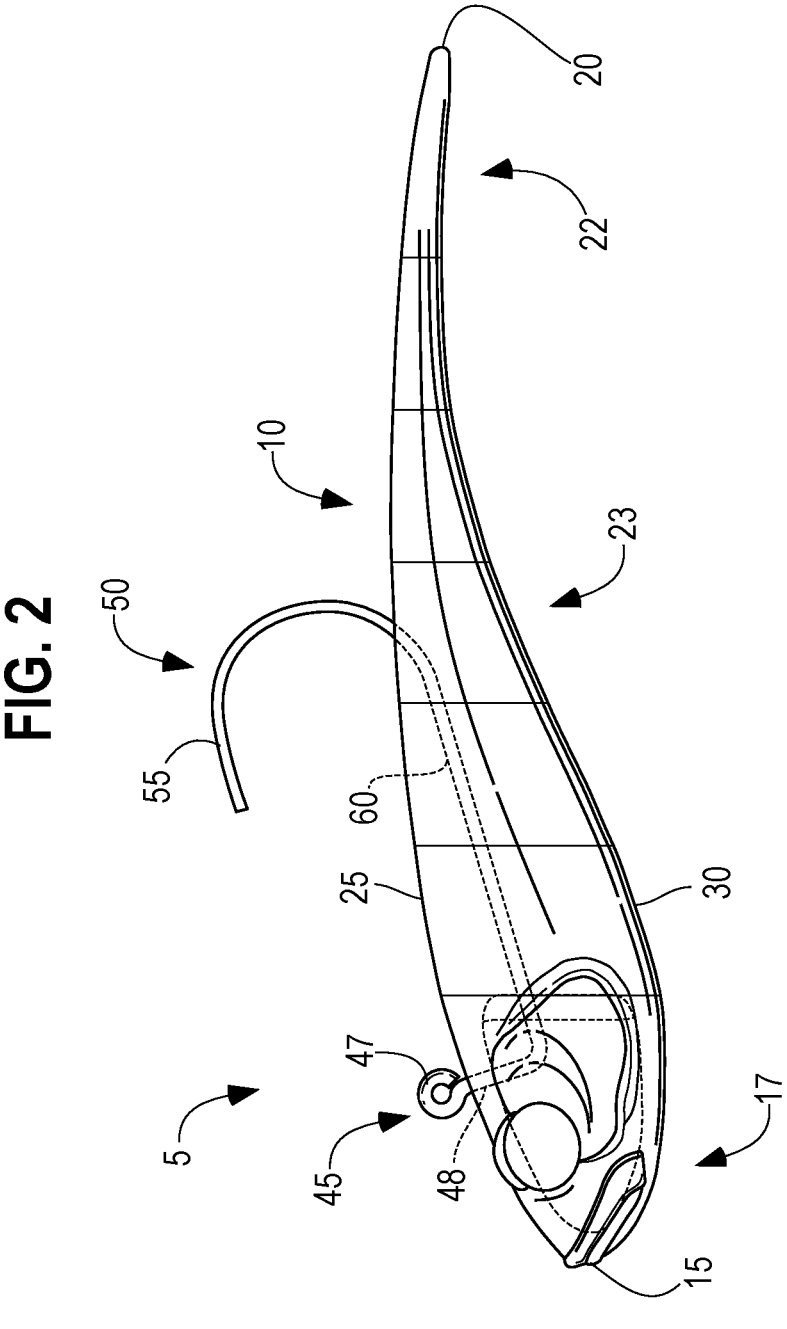
FIG. 2 is a transparent side plan view of the lure of FIG. 1.

The bait 5 may include a first attachment structure 45. The first attachment structure 45 may be configured to provide a tying point for a line and/or a connection point for a leader. For example, turning to FIG. 2, the first attachment structure 45 may comprise an eyelet 47 protruding from the body 10 of the bait 5 with a stem 48 embedded into the body 10, or may comprise another structure, for example, a hole in the body 10. As shown, the first attachment structure 45 may be located along the top 25 of the body 10 of the bait 5. Further, the first attachment structure 45 may be positioned along the length L1 and/or the width of the body 10 so that the bait 5 is balanced when supported to hang from the line/leader attached to the first attachment structure 45. The bait 5 may be balanced so that a longitudinal axis and/or a transverse axis of the bait 5 is substantially horizontal when so supported. Further, the bait 5 may be balanced when configured to include one or more hooks, such as described below.

Typically, the first attachment structure 45 is located on or near the top 25 of the head portion 17. In various embodiments, the first attachment structure 45 is located along the first 5% to 25% of the length L1 of the body 10, starting from the front end 15. For example, the first attachment structure 45 can be located along the first 10% to 20% or along the first 10% to 15% of the length L1 of the body 10, starting from the front end 15. The first attachment structure 45 can also be located near the center of gravity of the bait 5. For example, the center of gravity of the bait 5 can be within about 10% of the length L1 of the first attachment structure 45. Typically, the first attachment structure 45 is located near but slightly behind (i.e., within about 10%, within about 5%, or within about 1%) the center of gravity.

The body 10 of the bait 5 can also include a hook structure 50 comprising a hook 55 and a stem 60. The hook 55 can comprise a single hook, a treble hook, or any other appropriate hook structure known in the art. The stem 60 can be implanted into the body 10 of the bait 5, for example, on or near the top 25 of the bait 5 and/or on or near the middle portion 23 of the body 10 such that the hook 55 protrudes from the top 25 of the bait 5. In addition, the stem 60 of the hook structure 50 can be integrally formed with the stem 48 of the first attachment structure 45 such that the hook structure 50 and the first attachment structure 45 are a unitary component. The stem 60 can be oriented at an angle relative to both the longitudinal axis al of the bait 5 and the stem 48 of the first attachment structure 45. For example, the stem 60 of the hook structure 50 can be oriented at an angle of from about 5 degrees to about 30 degrees with respect to the longitudinal axis al of the bait 5, for example, from about 5 degrees to about 20 degrees, from about 10 degrees to about 20 degrees, or from about 15 degrees to about 20 degrees. Further, the stem 60 of the hook structure 50 can be oriented at an angle of from about 75 degrees to about 115 degrees relative to the stem 48 of the first attachment structure 45, for example, from about 80 degrees to about 100 degrees, from about 85 degrees to about 95 degrees, or about 90 degrees.

Figure 3:
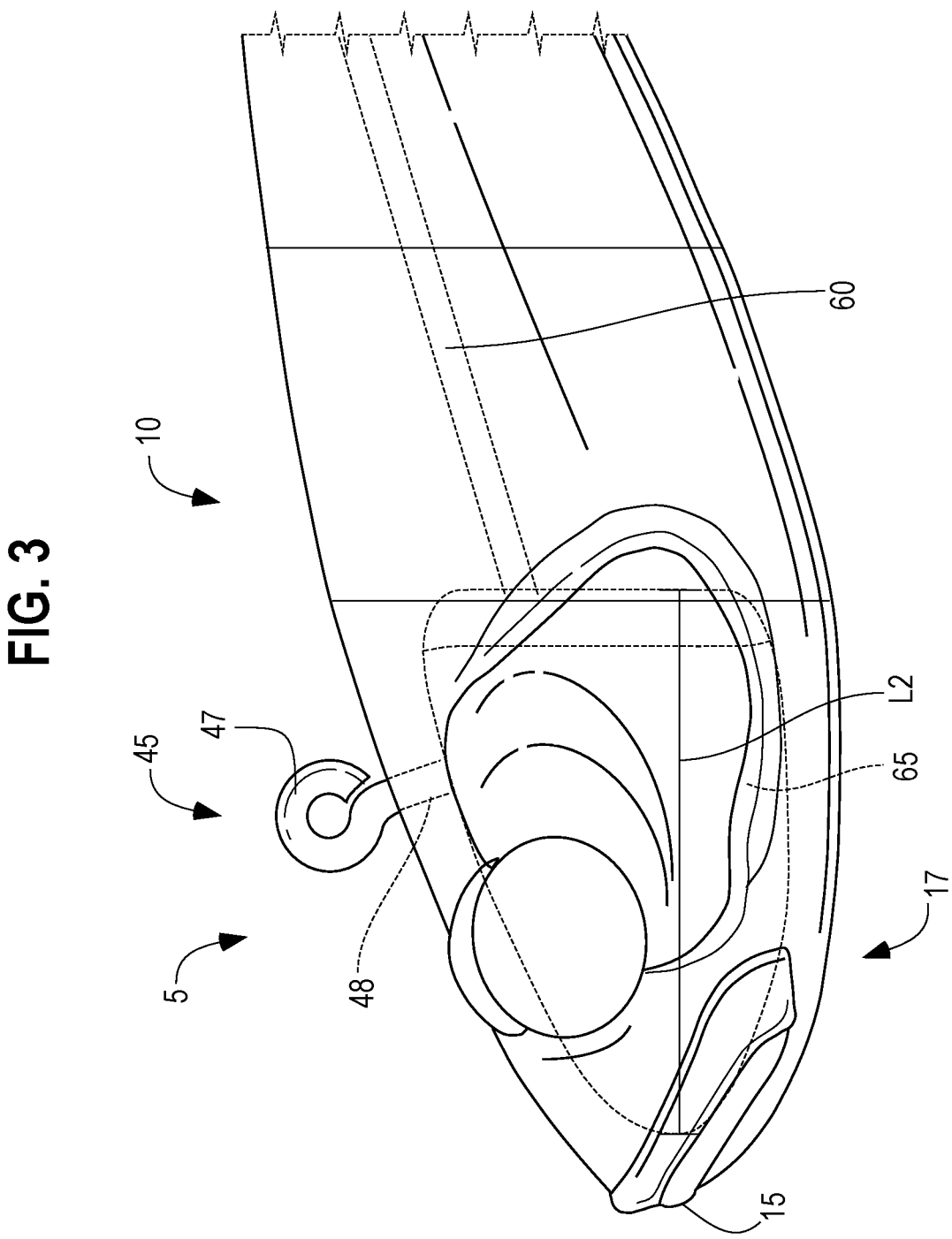
FIG. 3 is a semi-transparent side view of the head portion of the lure of FIG. 1.

Turning now to FIG. 3, the body 10 of the bait 5 can include a portion 65 composed of one or more high-density materials (e.g., lead, tungsten, or a combination thereof) therein. In particular, the portion 65 may be composed of a material that is denser than the plastic or rubber material of the body 10. Typically, the portion 65 is included in the interior volume of the head portion 17. The first attachment structure 45 can be positioned along a length L2 of the portion 65. For example, the first attachment structure 45 can be positioned from about 50% to about 75% along the length L2 of the portion 65. In some embodiments, the first attachment structure can be located from about 60% to about 70% along the length L2 of the portion 65. The portion 65 can comprise from about 10% to about 30% of the total volume of the body 10. For example, the portion 65 can comprise from about 15% to about 25% or about 20% of the total volume of the body 10. Further, the length L2 of the portion 65 may comprise from about 10% to about 30% of the length L1 (see, e.g., FIG. 1) of the body 10. For example, the length L2 of the portion 65 may comprise from about 15% to about 25% of the length L1 of the body 10 or about 20% of the length L1 of the body 10.

These described aspects allow the bait to remain in a particular (i.e., horizontal) orientation to improve readability of the bait location and direction from a sonar perspective. These features furthermore allow for an angler to vary bait action and location as required. For example, the features described herein allow the bait to dart in a side-to-side action to prolong time of the bait in the water.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

What is claimed is:

1. An artificial bait comprising:
a body having a first end and a second end;
a hook protruding from the body;
an attachment structure protruding from the body;
wherein the body extends a first length from the first end to the second end;

wherein the attachment structure is positioned and located between about 10% to about 20% of the first length from the first end of the body; and wherein the body is arched such that a first height of the body proximate to the first end and a second height of the body proximate to the second end are both less than a third height of the body positioned and located between the first end and the second end.

2. The artificial bait of claim 1, wherein the attachment structure is positioned and located within about 10% of the first length from a center of gravity of the artificial bait.

3. The artificial bait of claim 1, wherein the artificial bait is configured such that a longitudinal axis is oriented substantially horizontally when the artificial bait is supported by the attachment structure, and wherein the longitudinal axis extends from the first end of the body to the second end of the body.

4. The artificial bait of claim 1, wherein the body further includes:

a first portion composed of a first material;

a second portion composed of a second material;

wherein the first material is denser than the second material; and wherein between about 10% to about 30% of a total volume of the body is made up of the first portion.

5. The artificial bait of claim 4, wherein the attachment structure is coupled to the first portion of the body.

6. The artificial bait of claim 4, wherein the first portion extends a second length, and wherein the attachment structure is positioned and located between about 50% to about 75% of the second length from a front end of the first portion.

* * * * *